(12) United States Patent
Viswanathan et al.

(10) Patent No.: US 11,378,405 B2
(45) Date of Patent: Jul. 5, 2022

(54) METHOD AND APPARATUS FOR ITERATIVE REFINEMENT OF PARAMETERS OF A LOCALIZATION FRAMEWORK

(71) Applicant: HERE Global B.V., Eindhoven (NL)

(72) Inventors: Anirudh Viswanathan, Berkeley, CA (US); Matt Mott, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 445 days.

(21) Appl. No.: 16/227,664

(22) Filed: Dec. 20, 2018

(65) Prior Publication Data

US 2020/0200546 A1    Jun. 25, 2020

(51) Int. Cl.
*G01C 21/32* (2006.01)
*G06F 16/487* (2019.01)
*G05D 1/02* (2020.01)

(52) U.S. Cl.
CPC ........... *G01C 21/32* (2013.01); *G06F 16/487* (2019.01); *G05D 1/021* (2013.01); *G05D 2201/0213* (2013.01)

(58) Field of Classification Search
None
See application file for complete search history.

(56) References Cited

U.S. PATENT DOCUMENTS

| 9,367,811 B2 | 6/2016 | Ramachandran et al. |
| 2016/0202341 A1 | 7/2016 | Burgess et al. |
| 2019/0204092 A1* | 7/2019 | Wheeler ............... G05D 1/0246 |
| 2020/0166364 A1* | 5/2020 | Fujita ..................... G01S 19/14 |

OTHER PUBLICATIONS

Cottone. P. et al., *A Machine Learning Approach for User Localization Exploiting Connectivity Data*, Engineering Applications of Artificial Intelligence, vol. 50 (Apr. 2016) 125-134.

Lee. Y-C. et al., *Adaptive Localization for Mobile Robots in Urban Environments Using Low-Cost Sensors and Enhanced Topological Map*, The 15th International Conference on Advanced Robotics (ICAR) (Jun. 2011) 569-575.

Lima. O. et al., *A Case Study on Automatic Parameter Optimization of a Mobile Robot Localization Algorithm*, 2017 IEEE International Conference on Autonomous Robot Systems and Competitions (ICARSC) (Apr. 2017) 43-48.

* cited by examiner

*Primary Examiner* — James M McPherson
*Assistant Examiner* — Bakari Underwood
(74) *Attorney, Agent, or Firm* — Alston & Bird LLP

(57) ABSTRACT

Methods described herein relate to iteratively refining parameters of a localization framework for different data sources. Methods may include: receiving a map data set from a data source; applying an offset to the map data to generate an offset map data set; applying a localization framework between the map data set and the offset map data set to generate a localized data set; recovering offset data from the localized data set; iteratively tuning parameters of the localization framework in response to the offset data from the localized data set failing to correspond with the applied offset until offset data recovered from the localized data set corresponds to the applied offset; receiving sensor data from at least one sensor of a vehicle; applying the localization framework to the sensor data to locate the vehicle within a mapped region.

20 Claims, 3 Drawing Sheets

METHOD AND APPARATUS FOR ITERATIVE REFINEMENT OF PARAMETERS OF A LOCALIZATION FRAMEWORK

TECHNOLOGICAL FIELD

Example embodiments of the present invention relate generally to localization of data sources in a crowd-sourced scenario, and more particularly, to iteratively refining parameters of a localization framework to improve the automated location determination of sensed data within a mapped environment in order to update map data or generate new map data.

BACKGROUND

Road geometry modelling is very useful for map creation and identification of objects of interest in environments, such as road signs along a road segment. Such object identification may facilitate autonomous vehicle navigation along a prescribed path and/or visual localization of a vehicle traveling along a road segment based on scene or environment identification. Traditional methods for modelling of road geometry and environment or feature detection are resource intensive, often requiring significant amounts of human measurement and calculation. Such methods are thus time consuming and costly. Exacerbating this issue is the fact that many modern day applications require the analysis of large amounts of data, and therefore are not practical without quicker or less costly techniques.

The large volumes of data received with respect to maps, whether for map building and repair, or for vehicle navigation or autonomous control, must be accurately correlated with a map to accurately identify a location of the sensed data. This locating may require accuracy substantially greater than that available through satellite locating means. Alternative locating means may include vision-based mapping, triangulation of signals available, signal fingerprint recognition, etc. A localization framework may be used to identify the location of sensed data; however, a localization framework may require unique configuration for each data source from which sensed data is received, hindering the functionality of the localization framework.

BRIEF SUMMARY

Accordingly, a method, apparatus, and computer program product are provided for localization of data sources in a crowd-sourced scenario, and more particularly, to iteratively refining the location of sensed data within a mapped environment in order to update map data or generate new map data. Embodiments described herein may provide an apparatus including at least one processor and at least one non-transitory memory including computer program code instructions. The computer program code instructions configured to, when executed, cause the apparatus to at least: receive a map data set from a data source; apply an offset to the map data to generate an offset map data set; apply a localization framework between the map data set and the offset map data set to generate a localized data set; recover offset data from the localized data set; iteratively tune parameters of the localization framework in response to the offset data from the localized data set failing to correspond with the applied offset until offset data recovered from the localized data set corresponds to the applied offset; receive sensor data from at least one sensor of a vehicle; apply the localization framework with the iteratively tuned parameters of the localization framework to the sensor data to locate the vehicle within a mapped region; and provide for an update of a map database of the mapped region based on the sensor data and the location of the vehicle within the mapped region.

The parameters of the localization framework may include constrained parameters and unconstrained parameters. Iteratively tuning the parameters of the localization framework in response to the offset data from the localized data set failing to correspond with the applied offset may include causing the apparatus to perform a grid-search formulation over the constrained parameters to identify a subset of constrained parameters. The apparatus may also be caused to identify a subset of unconstrained parameters based, at least in part, on the subset of constrained parameters. Causing the apparatus to iteratively tune parameters of the localization framework in response to the offset data from the localized data set failing to correspond with the applied offset may optionally include performing a final iteration to identify a second subset of the constrained parameters and a second subset of the unconstrained parameters to be used as the iteratively tuned parameters of the localization framework. According to some embodiments, causing the apparatus to provide for an update of a map database of the mapped region based on the sensor data and the location of the vehicle within the mapped region may further include causing the apparatus to at least one of replace or adjust map data of the map database in response to the sensor data differing from data in the map database.

According to some embodiments, causing the apparatus to iteratively tune parameters of the localization framework in response to the offset data from the localized data set failing to correspond with the applied offset until offset data recovered from the localized data set corresponds to the applied offset may include causing the apparatus to: adjust at least one parameter by a predetermined increment in response to the offset from the localized data set failing to correspond with the applied offset; apply the localization framework including the at least one adjusted parameter between the map data set and the offset map data set to generate an iterated localized data set; recover the offset data from the iterated localized data set; and identify the localization framework with the iteratively tuned parameters as accurate in response to the offset data recovered from the iterated localized data set corresponding with the applied offset. The predetermined increment may be determined based on a specification of the map database.

Embodiments described herein may provide a computer program product including at least one non-transitory computer-readable storage medium having computer-executable program code instructions stored therein. The computer-executable program code instructions including program code instructions to: receive a map data set from a data source; apply an offset to the map data to generate an offset map data set; apply a localization framework between the map data set and the offset map data set to generate a localized data set; recover offset data from the localized data set; iteratively tune parameters of the localization framework in response to the offset data from the localized data set failing to correspond with the applied offset until offset data recovered from the localized data set corresponds to the applied offset; receive sensor data from at least one sensor of a vehicle; apply the localization framework with the iteratively tuned parameters of the localization framework to the sensor data to locate the vehicle within a mapped region; and provide for an update of a map database of the mapped region based on the sensor data and the location of the vehicle within the mapped region.

According to some embodiments, the parameters may include constrained parameters where the program code instructions to iteratively tune parameters of the localization framework in response to the offset data from the localized data set failing to correspond with the applied offset may include program code instructions to perform a grid-search formulation over the constrained parameters to identify a subset of constrained parameters. The program code instructions to iteratively tune parameters of the localization framework in response to the offset data from the localized data set failing to correspond with the applied offset may further include program code instructions to identify a subset of unconstrained parameters based, at least in part, on the subset of constrained parameters. The program code instructions to iteratively tune parameters of the localization framework in response to the offset data from the localized data set failing to correspond with the applied offset may include program code instructions to perform a final iteration to identify a second subset of the constrained parameters and a second subset of the unconstrained parameters to be used as the iteratively tuned parameters of the localization framework.

The program code instructions to provide for an update of a map database of the mapped region based on the sensor data and the location of the vehicle within the mapped region may include program code instructions to at least one of replace or adjust map data of the map database in response to the sensor data differing from data in the map database. The program code instructions to iteratively tune parameters of the localization framework in response to the offset data from the localized dataset failing to correspond with the applied offset until offset data recovered from the localized data set corresponds to the applied offset may include program code instructions to: adjust at least one parameter by a predetermined increment in response to the offset from the localized data set failing to correspond with the applied offset; apply the localization framework including the at least one adjusted parameter between the map data set and the offset map data set to generate an iterated localized data set; recover the offset data from the iterated localized data set; and identify the localization framework with the iteratively tuned parameters as accurate in response to the offset data recovered from the iterated localized data set corresponding with the applied offset. The predetermined increment may be determined based on a specification of the map database.

Embodiments described herein may provide a method including: receiving a map data set from a data source; applying an offset to the map data to generate an offset map data set; applying a localization framework between the map data set and the offset map data set to generate a localized data set; recovering offset data from the localized data set; iteratively tuning parameters of the localization framework in response to the offset data from the localized data set failing to correspond with the applied offset until offset data recovered from the localized data set corresponds to the applied offset; receiving sensor data from at least one sensor of a vehicle; applying the localization framework to the sensor data to locate the vehicle within a mapped region; and providing for an update of a map database of the mapped region based on the sensor data and the location of the vehicle within the mapped region. The parameters may include constrained parameters and unconstrained parameters, where iteratively tuning parameters of the localization framework in response to the offset data from the localized data set failing to correspond with the applied offset may include performing a grid-search formulation over the constrained parameters to identify a subset of constrained parameters.

According so some embodiments, iteratively tuning parameters of the localization framework in response to the offset data from the localized data set failing to correspond with the applied offset may include identifying a subset of unconstrained parameters based, at least in part, on the subset of constrained parameters. Iteratively tuning parameters of the localization framework in response to the offset data from the localized data set failing to correspond with the applied offset may include performing a final iteration to identify a second subset of the constrained parameters and a second subset of the unconstrained parameters to be used as the iteratively tuned parameters of the localization framework. Providing for an update of a map database of the mapped region based on the sensor data and the location of the vehicle within the mapped region may include at least one of replacing or adjusting map data of the map database in response to the sensor data differing from data in the map database.

Iteratively tuning parameters of the localization framework in response to the offset data from the localized data set failing to correspond with the applied offset until offset data recovered from the localized data set corresponds to the applied offset may include: adjusting the at least one parameter by a predetermined increment in response to the offset from the localized data set failing to correspond with the applied offset; applying the localization framework including the at least one adjusted parameter between the map data set and the offset map data set to generate an iterated localized data set; recovering the offset data from the iterated localized data set; and identifying the localization framework with the iteratively tuned parameters as accurate in response to the offset data recovered from the iterated localized data set corresponding with the applied offset.

Embodiments described herein may provide an apparatus including: means for receiving a map data set from a data source; means for applying an offset to the map data to generate an offset map data set; means for applying a localization framework between the map data set and the offset map data set to generate a localized data set; means for recovering offset data from the localized data set; means for iteratively tuning parameters of the localization framework in response to the offset data from the localized data set failing to correspond with the applied offset until offset data recovered from the localized data set corresponds to the applied offset; means for receiving sensor data from at least one sensor of a vehicle; means for applying the localization framework to the sensor data to locate the vehicle within a mapped region; and means for providing for an update of a map database of the mapped region based on the sensor data and the location of the vehicle within the mapped region. The parameters may include constrained parameters and unconstrained parameters, where the means for iteratively tuning parameters of the localization framework in response to the offset data from the localized data set failing to correspond with the applied offset may include means for performing a grid-search formulation over the constrained parameters to identify a subset of constrained parameters.

According so some embodiments, the means for iteratively tuning parameters of the localization framework in response to the offset data from the localized data set failing to correspond with the applied offset may include means for identifying a subset of unconstrained parameters based, at least in part, on the subset of constrained parameters. The means for iteratively tuning parameters of the localization framework in response to the offset data from the localized data set failing to correspond with the applied offset may include means for performing a final iteration to identify a second subset of the constrained parameters and a second subset of the unconstrained parameters to be used as the iteratively tuned parameters of the localization framework. The means for providing for an update of a map database of the mapped region based on the sensor data and the location of the vehicle within the mapped region may include means for at least one of replacing or adjusting map data of the map database in response to the sensor data differing from data in the map database.

The means for iteratively tuning parameters of the localization framework in response to the offset data from the localized data set failing to correspond with the applied offset until offset data recovered from the localized data set corresponds to the applied offset may include: means for adjusting the at least one parameter by a predetermined increment in response to the offset from the localized data set failing to correspond with the applied offset; means for applying the localization framework including the at least one adjusted parameter between the map data set and the offset map data set to generate an iterated localized data set; recovering the offset data from the iterated localized data set; and means for identifying the localization framework with the iteratively tuned parameters as accurate in response to the offset data recovered from the iterated localized data set corresponding with the applied offset.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
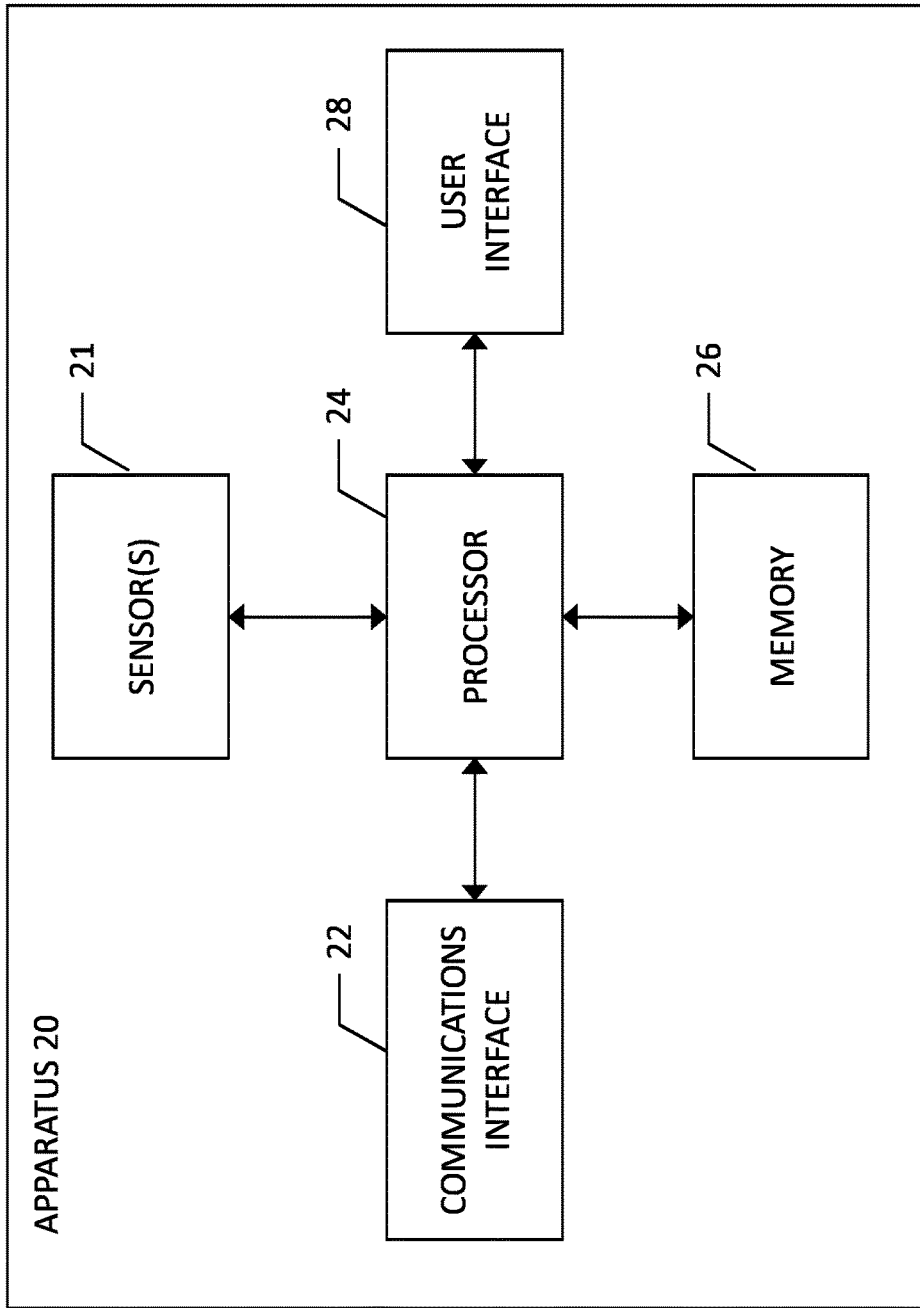
Figure 2:
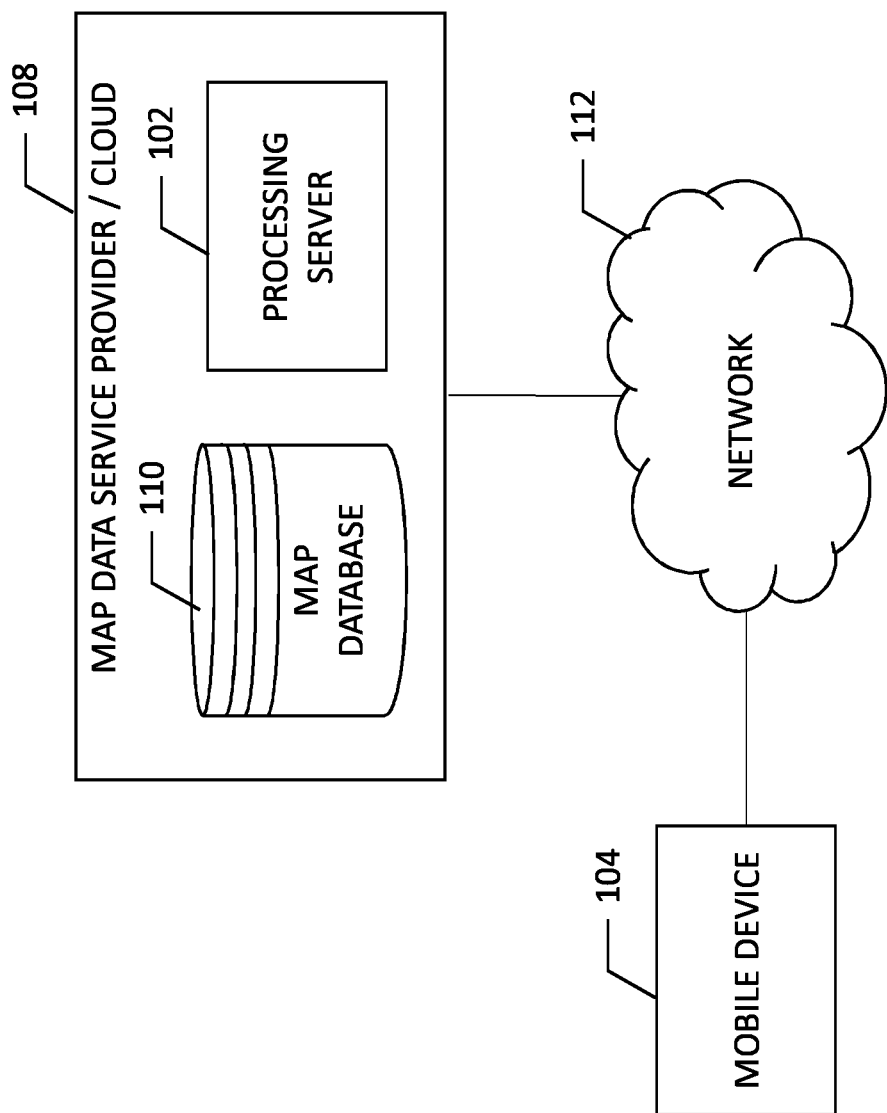
Figure 3:
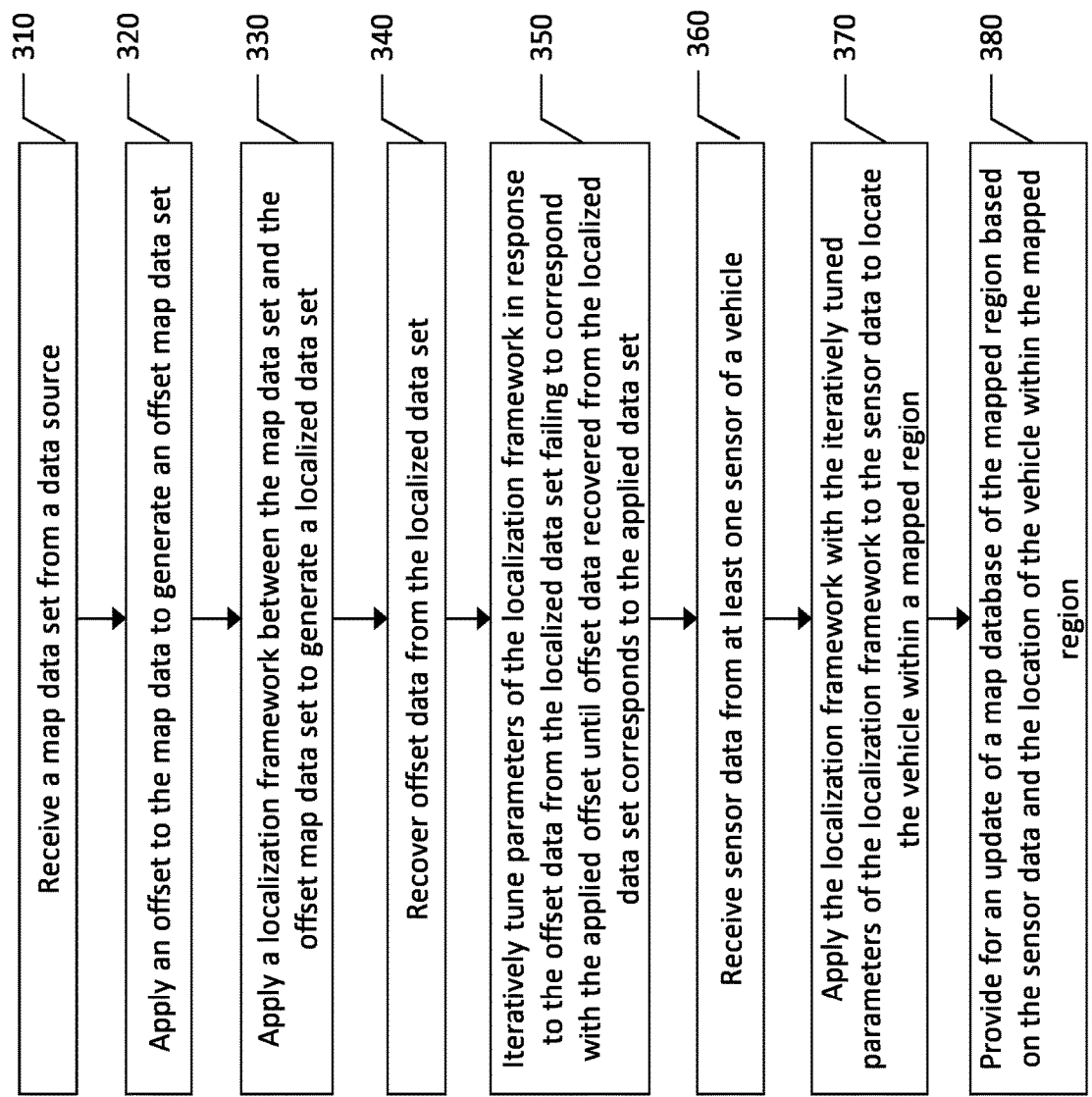

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for to iteratively refining parameters of a localization framework according to an example embodiment of the present disclosure; and FIG. 3 is a flowchart of operations to iteratively refining parameters of a localization framework according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for localization of data sources in a crowd-sourced scenario, and more particularly, to iteratively refining parameters of a localization framework to improve the automated location determination of sensed data within a mapped environment in order to update map data or generate new map data. Embodiments may further relate to mapping of a region using three-dimensional rendering based on sensed data from a plurality of sensors traversing the region.

Embodiments described herein relate to localization of data sources in a crowd-sourced scenario, or in the real-time context of localizing data from different sources, such as autonomous vehicles, to a map, such as a high-definition "HD" map that includes high levels of detail with respect to a mapped environment. The localization framework described herein is used to register incoming data from sensors of an apparatus (e.g., an autonomous vehicle) using the initial Global Positioning System (GPS) location as an approximation, and iteratively refining parameters of the localization framework to improve the accuracy of the localized position of the apparatus relative to the HD map. Once localized, the sensor data may be fully-registered to the map, and may be used to update the map, generate new map data, or for map healing efforts where map data is corrected according to the sensed data.

Satellite-based locationing systems may provide a location within an environment, the accuracy may be limited to within a matter of feet or yards of an actual location. Such location identification may be adequate for some use cases, other use cases may require greater location accuracy, such as within inches. When a GPS location is not of sufficient accuracy, a localization framework may be used to position the apparatus relative to a map using on-board sensor readings. Embodiments described herein may be of particular benefit to vehicle locationing, where identifying the location of a vehicle may be important. Vehicle navigation or autonomous or semi-autonomous vehicle control may rely on accurate identification of a location of a vehicle. As such, it may be important to determine the location of such a vehicle even when satellite based navigation means are not available or reliable. Such localization may also benefit the digital HD maps such that sensor data from a vehicle may be used to update, repair, or generate map data for the digital HD maps, though a relatively accurate location of the apparatus sensing the data may be required to reliably update HD maps.

FIG. 1 is a schematic diagram of an example apparatus configured for performing some of the operations described herein, particularly the gathering and processing of sensor data that is geo-referenced for inclusion in an HD map database, or capturing sensor data to compare against a map database of geo-referenced sensor data to identify the location of a vehicle. Apparatus 20 is an example embodiment that may be embodied by or associated with any of a variety of computing devices that include or are otherwise associated with a device configured for providing an advanced driver assistance features. For example, the computing device may be an Advanced Driver Assistance System module (ADAS) which may at least partially control autonomous or semi-autonomous features of a vehicle with the assistance of establishing the vehicle location using a localization framework according to example embodiments described herein; however embodiments of the apparatus may be embodied or partially embodied as a mobile terminal, such as a personal digital assistant (PDA), mobile telephone, smart phone, personal navigation device, tablet computer, camera or any combination of the aforementioned systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, image sensor, LiDAR (Light Distancing and Ranging) sensor, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may optionally support wired communication may alternatively support vehicle to vehicle or vehicle to infrastructure wireless links.

The apparatus 20 may support a mapping or navigation application so as to present maps or otherwise provide navigation, driver assistance, or some degree of autonomous control of a vehicle. For example, the apparatus 20 may provide for display of a map and/or instructions for following a route within a network of roads via user interface 28. In order to support a mapping application, the computing device may include or otherwise be in communication with a geographic database, which may be a map of a vision-based mapping system, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example in which the apparatus is embodied by a vehicle, the memory 26 may store a portion of a map database including only portions of the database that are within a predetermined geographic region relative to the vehicle such that latency may be minimized when establishing a location through analysis of the geo-referenced images.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Having an accurate understanding of a location is critical to navigation assistance and autonomous or semi-autonomous vehicle control.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. Autonomous and semi-autonomous vehicle control may be performed in a variety of different ways. However, an understanding of the location of the vehicle is critical when using any form of map-based vehicle control. While some degree of autonomy can be provided through visual identification of objects along a road by a vehicle traveling along the road, such vision-based autonomous control strategies may benefit from or rely upon proper location identification of the vehicle among the road network. For example, accurately identifying the location of a vehicle along a road segment may enable identification of roadway restrictions, such as a speed limit, but also provide an understanding of the road geometry which may be stored in the map database, such as in a High Definition (HD) map database.

Autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Embodiments described herein may facilitate the building and updating of HD maps through the creation and updating of a map environment based on accurate location identification of a sensor or apparatus producing sensed data. Embodiments may create a visual map of an environment and/or a three dimensional model of an environment for inclusion in an HD map.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data, geo-referenced image data for vision-based locating, or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 110.

The map database 110 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features and/or to facilitate autonomous or partial autonomous control of a vehicle. In such a case, the map database 110 can be downloaded or stored on the end user device which can access the map database 110 through a wireless or wired connection, such as via a processing server 102 and/or the network 112, for example. Such an embodiment may benefit vehicles using or relying on vision-based locating by storing or caching a portion of the database of geo-tagged images used for vision-based mapping on memory local to the vehicle in order to reduce or eliminate latency, which may be important during autonomous vehicle control that relies upon accurate location identification during operation.

As described above, the map database 110 of example embodiments may be generated from a plurality of different sources of data. Additional data may be stored in the map database such as traffic information, routing information, etc. This data may supplement the HD map data that provides an accurate depiction of a network of roads in the geographic region in a high level of detail including road geometries, features along the roads such as signs, rules related to travel along road segments such as speed limits, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible.

Autonomous and semi-autonomous vehicles leverage sensor information relating to roads, objects, and features proximate the roads to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed signs and detailed information contained therein along with other features or objects proximate a roadway.

HD maps may have a high precision at resolutions that may be down to a several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors, such as sensors 21 of apparatus 20 of FIG. 1. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

Crowd-sourced sensor data that may be used for updating, repairing, and generating HD map data may be generated from a plurality of different types of sensors having different qualities of sensors and different capabilities. Different vehicle manufacturers or device manufacturers may offer different levels of sensor data from different sensor suites associated with a vehicle or device. As such, a challenge faced with different sensor platforms and data sourced from crowd-sourced apparatuses is that the parameters within the localization framework need to be individually tuned to ensure the sensed data is robust. Parameters that require tuning may include distances between a GPS antenna and other sensors, such as cameras or LiDAR sensors. The offset between a GPS sensor and other sensors of a vehicle may be substantial, particularly when using data from such sensors to inform an HD map with accuracy required on the order of inches. Further, camera specific angles and camera mounting configurations may affect the interpretation of the sensed data from the respective sensors.

When sensed data from a new apparatus or from a new vendor is to be localized, or precisely located on a map such as the HD map, conventionally a manual operator may be needed to modify the parameters of the localization framework and manually verify the results relative to the map data. This approach requires expert insight into the workings of the localizer, and does not scale well to deployment by third parties who may be unfamiliar with the intricacies of the localizer. Using a human operator to manually change and tune parameters is also subject to error as it relies upon the manual operator having substantial localization expertise. Such manual tuning does not scale to hundreds of vendor types or different sensor configurations since the approach is expensive, time consuming, and labor intensive.

Embodiments described herein use a data-driven approach to directed-parameter tuning. The parameters with the localizer may be estimated in advance of receiving sensor data and do not require manual tuning such that embodiments of the present disclosure may be efficient and useful by third parties who are not necessarily familiar with the internal operation of the localization framework. The localizer parameters may be determined from known, true data that has previously been map matched manually or estimated based on prior results from the localizer, for example.

An example embodiment may include where sensor data is received from a data source, which may be a data vendor or data from a particular manufacturer of vehicle or sensor suite, for example. If the data source is new and unfamiliar to the localizer framework, tuning of localizer framework parameters may be performed specific to the new data source. To tune the parameters, known-good or true mapped data from the new data source may be retrieved. An offset may be applied to the true mapped data from the new source. The localizer framework may be applied between the true mapped data and the offset data. The localizer may then recover the offsets from the offset data if the parameters are tuned correctly, where the recovered offsets correspond to the applied offsets. Essentially running a self-check on the output data from the localizer. If the recovered offsets do not correspond to the applied offsets, iterative tuning of parameters of the localizer framework may be performed until the applied offsets match the recovered offsets in the output of the localizer framework using the tuned parameters. The parameters used for tuning may be established based on, for example, a grid-search formulation over the constrained parameter space can be used to identify a subset of parameters to use that will lead to the correct estimation of the localization offsets.

According to example embodiments, parameters of the localizer may be categorized as constrained or unconstrained, with predefined step sizes as determined by the specification of the HD map for which the sensed data is to be used. For instance, a pitch angle of a camera may be constrained to three degrees above the horizon to 45 degrees below the horizon, with a pitch delta of a tenth of a degree. Unconstrained parameters may include a number of particles in a particle filter framework, where the number may default to a pre-specified number.

In order to perform the parameter search, a local map of the environment which may be stored, for example, in map database 110, may be bootstrapped from one or more drives from a specific vendor. A predetermined offset may be applied, such as via processing server 102, to the vendor data which simulates inherent GPS errors, where the localization framework is run between the original dataset and the dataset having offsets. The localizer may then recover the offsets, provided the parameters are properly tuned. A grid-search formulation over the constrained parameters space may be performed to determine the best subset of parameters that lead to correct estimation of the localization offsets. For the unconstrained parameters, tuning is performed after the constrained parameters are estimated using a log-scale of search values. A final iteration may be performed to identify the best subset of parameters for the localizer. For new vendor data, the parameter estimator may be run, while the optimal subset of parameters is automatically generated. Localization can subsequently be performed with no manual tuning required.

Embodiments described herein do not require expert insight into how the localization framework is written at the code level, making the localization solution scalable to third party users. Fully automated quality assurance is built into the parameter estimation step, which ensures that the best possible localization result will be generated given a specific set of parameters from the data vendor.

This data-driven approach to directed parameter tuning is efficient and effective as it does not require manual tuning of parameters and the parameters of the localizer are fully estimated before receipt of the vendor data. As such, this solution may be deployed by third parties who are unfamiliar with the localization framework's internal operation, providing a solution that may be widely adopted and accurate.

Upon receipt of sensor data from a vehicle, where the sensor data is crowd-sourced from autonomous vehicles traveling within a road network mapped by an HD map, the sensor data is processed using the localization framework based on the iteratively tuned parameters of the localization framework. The output of the localizer is an accurate location of the vehicle within a mapped region. The sensor data from the located vehicle may then be used to update a map database corresponding to the mapped region. This sensor data from a vehicle is registered to the HD map, and the map may be updated, repaired, or generated from this data. Optionally, identifying the location of the vehicle using the tuned localization framework may be used for autonomous vehicle control as described above.

A visual map generated through embodiments described herein may provide a comprehensive database of the environment along each road segment of a network of roadways. The visual map may be part of or work in concert with HD maps as described above to facilitate navigational assistance, autonomous or semi-autonomous driving, and accurate location identification. This method of localization or location determination may facilitate navigation and various degrees of autonomous vehicle control.

As described above, HD maps and the visual maps generated as described herein may be instrumental in facilitating autonomous vehicle control. Building the HD maps and visual maps may rely on sensor data received from crowd sourced detectors including image sensors and depth detectors (e.g., LiDAR) from vehicles traveling along the network of roads that is mapped. The sensor data that is received is processed to identify objects and features in the sensor data, such that upon localizing using methods described herein, properly build and update the HD maps and visual maps, and to facilitate autonomous control of the vehicle generating the sensed data.

According to example embodiments described herein, the role of HD maps and visual maps in facilitating autonomous or semi-autonomous vehicle control may include crowd-sourced building of the maps to identify and confirm objects within the environment of a vehicle along with their respective locations. In the context of map-making, the features from the environment may be detected by a perception system of a map services provider or a vehicle traveling along a road segment and consolidated to form a representation of the actual real-world environment in the form of a map.

A vehicle traveling along a road segment may receive sensor data from a plurality of sensors used to capture data relating to the surrounding environment. A vehicle with autonomous or semi-autonomous control may detect features in the environment of the vehicle using a perception system trained according to embodiments described herein to facilitate the autonomous or semi-autonomous control. Sensor redundancy may be used to provide additional confirmation relating to features and objects of the environment and to improve detection and reliability of vehicle interpretation of the surrounding environment. In order to implement full autonomy for a vehicle, the vehicle must be contextually aware in that the vehicle must be aware of the surroundings in terms of both dynamic conditions (e.g., weather, traffic, construction) and static conditions (e.g., road geometry, road signs). The vehicle context may be interpreted based on sensor observations that are passed through a perception module to understand the content of the observed environment. The perception module's set of detectors may correspond to deep-neural network based methods of understanding features in the environment and identifying a location of the features in the environment. Embodiments described herein include a method to improve the performance of accurately locating a vehicle within a mapped region such that sensed data from the vehicle may be used to reliably facilitate autonomous vehicle control and/or map building and updating.

FIG. 3 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 3 is a flowchart of a method for iteratively refining parameters of a localization framework to improve the automated location determination of sensed data within a mapped environment in order to update map data or generate new map data. As shown, at 310, a map data set is received from a data source. In an example implementation of the flowchart, this data source may be new such that the localizer is not yet tuned to the data source. An offset to the map data set is applied at 320 to generate an offset map data set. A localization framework is applied between the map data set and the offset map data set to generate a localized data set at 330. The offset data from the localized data set is recovered by the localizer at 340. If the offset from the localized data set does not correspond to the applied offset, parameters of the localization framework may be iteratively tuned as shown at 350 until the recovered offset from the localized data set matches the applied offset. Once the localizer parameters are tuned, the localizer framework may be used to locate sensor data. Sensor data from at least one sensor of a vehicle is received at 360, where the localization framework with the iteratively tuned parameters are applied to the sensor data at 370 to locate the vehicle within the mapped region. Once located, an update of a map database is provided at 380 of the mapped region based on the sensor data and the location of the vehicle within the mapped region.

In an example embodiment, an apparatus for performing the method of FIG. 3 above may comprise a processor (e.g., the processor 24) configured to perform some or each of the operations (310-380) described above. The processor may, for example, be configured to perform the operations (310-380) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-380 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:

receive a map data set from a data source;

apply an offset to the map data to generate an offset map data set;

apply a localization framework between the map data set and the offset map data set to generate a localized data set;

recover offset data from the localized data set;

iteratively tune parameters of the localization framework in response to the offset data from the localized data set failing to correspond with the applied offset until offset data recovered from the localized data set corresponds to the applied offset;

receive sensor data from at least one sensor of a vehicle;

apply the localization framework with the iteratively tuned parameters of the localization framework to the sensor data to locate the vehicle within a mapped region; and provide for an update of a map database of the mapped region based on the sensor data and the location of the vehicle within the mapped region.

2. The apparatus of claim 1, wherein the parameters comprise constrained parameters and unconstrained parameters, wherein causing the apparatus to iteratively tune parameters of the localization framework in response to the offset data from the localized data set failing to correspond with the applied offset comprises causing the apparatus to:

perform a grid-search formulation over the constrained parameters to identify a subset of constrained parameters.

3. The apparatus of claim 2, wherein causing the apparatus to iteratively tune parameters of the localization framework in response to the offset data from the localized data set failing to correspond with the applied offset further comprises causing the apparatus to:

identify a subset of unconstrained parameters based, at least in part, on the subset of constrained parameters.

4. The apparatus of claim 3, wherein causing the apparatus to iteratively tune parameters of the localization framework in response to the offset data from the localized data set failing to correspond with the applied offset further comprises causing the apparatus to:

perform a second iteration to identify a second subset of the constrained parameters and a second subset of the unconstrained parameters to be used as the iteratively tuned parameters of the localization framework.

5. The apparatus of claim 1, wherein causing the apparatus to provide for an update of a map database of the mapped region based on the sensor data and the location of the vehicle within the mapped region further comprises causing the apparatus to at least one of replace or adjust map data of the map database in response to the sensor data differing from data in the map database.

6. The apparatus of claim 1, wherein causing the apparatus to iteratively tune parameters of the localization framework in response to the offset data from the localized data set failing to correspond with the applied offset until offset data recovered from the localized data set corresponds to the applied offset comprises causing the apparatus to:

adjust at least one parameter by a predetermined increment in response to the offset from the localized data set failing to correspond with the applied offset;

apply the localization framework including the at least one adjusted parameter between the map data set and the offset map data set to generate an iterated localized data set;

recover the offset data from the iterated localized data set; and identify the localization framework with the iteratively tuned parameters as accurate in response to the offset data recovered from the iterated localized data set corresponding with the applied offset.

7. The apparatus of claim 6, wherein the predetermined increment is determined based on a specification of the map database.

8. A computer program product comprising at least one non-transitory computer-readable storage medium having computer-executable program code instructions stored therein, the computer-executable program code instructions comprising program code instructions to:

receive a map data set from a data source;
apply an offset to the map data to generate an offset map data set;
apply a localization framework between the map data set and the offset map data set to generate a localized data set;
recover offset data from the localized data set;
iteratively tune parameters of the localization framework in response to the offset data from the localized data set failing to correspond with the applied offset until offset data recovered from the localized data set corresponds to the applied offset;
receive sensor data from at least one sensor of a vehicle;
apply the localization framework with the iteratively tuned parameters of the localization framework to the sensor data to locate the vehicle within a mapped region; and
provide for an update of a map database of the mapped region based on the sensor data and the location of the vehicle within the mapped region.

9. The computer program product of claim 8, wherein the parameters comprise constrained parameters and unconstrained parameters, wherein the program code instructions to iteratively tune parameters of the localization framework in response to the offset data from the localized data set failing to correspond with the applied offset comprise program code instructions to:
perform a grid-search formulation over the constrained parameters to identify a subset of constrained parameters.

10. The computer program product of claim 9, wherein the program code instructions to iteratively tune parameters of the localization framework in response to the offset data from the localized data set failing to correspond with the applied offset further comprise program code instructions to:
identify a subset of unconstrained parameters based, at least in part, on the subset of constrained parameters.

11. The computer program product of claim 10, wherein the program code instructions to iteratively tune parameters of the localization framework in response to the offset data from the localized data set failing to correspond with the applied offset further comprise program code instructions to:
perform a second iteration to identify a second subset of the constrained parameters and a second subset of the unconstrained parameters to be used as the iteratively tuned parameters of the localization framework.

12. The computer program product of claim 8, wherein the program code instructions to provide for an update of a map database of the mapped region based on the sensor data and the location of the vehicle within the mapped region further comprise program code instructions to at least one of replace or adjust map data of the map database in response to the sensor data differing from data in the map database.

13. The computer program product of claim 8, wherein the program code instructions to iteratively tune parameters of the localization framework in response to the offset data from the localized data set failing to correspond with the applied offset until offset data recovered from the localized data set corresponds to the applied offset comprise program code instructions to:
adjust at least one parameter by a predetermined increment in response to the offset from the localized data set failing to correspond with the applied offset;
apply the localization framework including the at least one adjusted parameter between the map data set and the offset map data set to generate an iterated localized data set;
recover the offset data from the iterated localized data set; and
identify the localization framework with the iteratively tuned parameters as accurate in response to the offset data recovered from the iterated localized data set corresponding with the applied offset.

14. The computer program product of claim 13, wherein the predetermined increment is determined based on a specification of the map database.

15. A method comprising:
receiving a map data set from a data source;
applying an offset to the map data to generate an offset map data set;
applying a localization framework between the map data set and the offset map data set to generate a localized data set;
recovering offset data from the localized data set;
iteratively tuning parameters of the localization framework in response to the offset data from the localized data set failing to correspond with the applied offset until offset data recovered from the localized data set corresponds to the applied offset;
receiving sensor data from at least one sensor of a vehicle;
applying the localization framework with the iteratively tuned parameters of the localization framework to the sensor data to locate the vehicle within a mapped region; and
providing for an update of a map database of the mapped region based on the sensor data and the location of the vehicle within the mapped region.

16. The method of claim 15, wherein the parameters comprise constrained parameters and unconstrained parameters, wherein iteratively tuning parameters of the localization framework in response to the offset data from the localized data set failing to correspond with the applied offset comprises:
performing a grid-search formulation over the constrained parameters to identify a subset of constrained parameters.

17. The method of claim 16, wherein iteratively tuning parameters of the localization framework in response to the offset data from the localized data set failing to correspond with the applied offset further comprises:
identifying a subset of unconstrained parameters based, at least in part, on the subset of constrained parameters.

18. The method of claim 17, wherein iteratively tuning parameters of the localization framework in response to the offset data from the localized data set failing to correspond with the applied offset further comprises:
performing a second iteration to identify a second subset of the constrained parameters and a second subset of the unconstrained parameters to be used as the iteratively tuned parameters of the localization framework.

19. The method of claim 15, wherein providing for an update of a map database of the mapped region based on the sensor data and the location of the vehicle within the mapped region further comprises at least one of replacing or adjusting map data of the map database in response to the sensor data differing from data in the map database.

20. The method of claim 15, wherein iteratively tuning parameters of the localization framework in response to the offset data from the localized data set failing to correspond with the applied offset until offset data recovered from the localized data set corresponds to the applied offset comprises:

adjusting at least one parameter by a predetermined increment in response to the offset from the localized data set failing to correspond with the applied offset;
applying the localization framework including the at least one adjusted parameter between the map data set and the offset map data set to generate an iterated localized data set;
recovering the offset data from the iterated localized data set; and
identifying the localization framework with the iteratively tuned parameters as accurate in response to the offset data recovered from the iterated localized data set corresponding with the applied offset.

* * * * *